Jan. 1, 1957     I. E. McCABE     2,776,353
TEMPERATURE RESPONSIVE DEVICE
Filed March 11, 1955
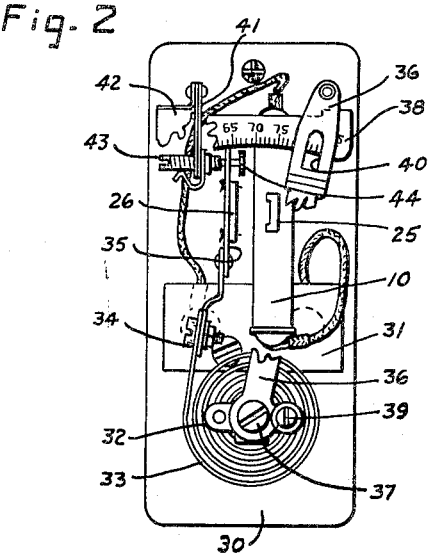
INVENTOR.
IRA E. McCABE
BY
Williamson Hulley Byrne & Hume
Attys.

United States Patent Office 2,776,353
Patented Jan. 1, 1957

2,776,353

TEMPERATURE RESPONSIVE DEVICE

Ira E. McCabe, Chicago, Ill.

Application March 11, 1955, Serial No. 493,674

7 Claims. (Cl. 200—136)

The invention relates to temperature responsive devices and has reference more particularly to devices of this nature employing magnetic operating means as part of switch operating structure and wherein an operator of Curie temperature material is used to accelerate response of the instrument at the various temperature settings over the operating range to thereby reduce switch operating differentials to minute fractions of a degree.

In the field of home heating the feeling of comfort and satisfaction with a properly engineered heating installation can be attributed to the room thermostat which senses the temperature conditions in the living areas to demand or to curtail the degree of heat thereto in order to maintain a desired temperature. It is the device which the householder looks upon to supervise the house heating to meet his needs. Consequently, the better the thermostat keeps in step with changing room temperatures, the less change in room temperature between initiating a call for heat and terminating it and therefore the less noticeable the variations in room temperature by the occupants.

Various types of room thermostats are in use at the present time. The most popular types include a bi-metallic element cooperating with contacts to open and close an electric circuit at predetermined settings. Many of these thermostats include permanent magnets either as an operating part of the switch structure, or as a means to obtain a snap action in the make and break of the contacts and to maintain closed circuits against the forces of vibration causing chattering of the contacts.

In striving to obtain close operating differentials some thermostats include heaters to accelerate movement of the bi-metal operator while others employ magnetically operated enclosed mercury switches requiring very little power for operation in combination with a minimum of instrument mass to reduce its effect on the sensitiveness of response of the device to changes in room temperature.

In the heat accelerating type of thermostat the use of small heating elements produces a warming effect upon the thermostat when its contacts are closed so that the contacts are opened in anticipation of heat developed by the heating plant but which has not been fully delivered to the area to be heated. The action of the bi-metal operator at the said thermostat setting is accelerated and less variation in room temperature may be obtained than if the operator were only responsive to ambient temperature changes, although difficulty may sometimes be incurred in providing heater adjustment suitable for all demands for heat.

Furthermore, the heat anticipating type of thermostat, in the field of domestic gas heating, can not always be used to utilize the warming effect of the heating element and consequently fails to be sensitive enough in operation, so that, wide fluctuations in room temperature result to the discomfort and dissatisfaction of the occupants. The difficulty arises when such thermostats are used in domestic gas heating systems embodying the commonly used type of gas pilot devices incorporating thermopile generators. The thermostat is connected in the control circuit which derives its electric current from the thermopile. The current in this circuit is very minute and insufficient to actuate the heater in the thermostat. Thus, the accelerating or anticipating effect is lost and the operation of the thermostat widens out to produce greater changes in room temperature.

In the other type of thermostats the incorporation of magnetically operated mercury switches requiring but minute magnetic forces for their operation, makes possible the employment of a large area of relatively thin sensitive bi-metal and with it a minimum of mass constituting the operating structure and enclosure. This combination provides a sensing device which closely follows temperature changes.

Although these two types afford closer control of room temperature than obtainable with some other commercial forms, it is still desirable to improve their sensitivity. The ultimate in thermostat control would of course be one wherein the device is in perfect accord with temperature variations. Naturally this is not obtainable but the need is recognized for as close an approach to this degree of perfection as it is possible to obtain.

Accordingly, the present invention seeks to attain the above stated objective by introducing a Curie temperature metal into the combination of a magnetically actuated mercury switch and a temperature responsive operator comprising a temperature responsive controlling device whereby to accelerate response of the device by the conjoint action of the operator and the magnetic qualities of the Curie temperature metal which is evident throughout the operating range of the device.

Curie temperature alloys are temperature sensitive alloys which become non-magnetic if they are heated above a temperature known as the Curie temperature and become increasingly magnetic as their temperature declines below the Curie point. Many such alloys are available each with their particular Curie temperature characteristics which thus affords a selection from which one best suited for a particular application and range of temperature operation may be chosen. Curie temperature alloys have heretofore been used as magnetic operators to actuate switches at predetermined temperatures. However, as the sole operating member said Curie metal, even though capable of adjustment as regards it particular switch structure, has a very limited range through which close operating differentials may be maintained. Thus the particular metal in question, since its magnetic characteristics vary with temperature change, is not well adapted for use as sole operators of switch structures, especially where it is desired to maintain close operation in response to changes over a reasonably wide temperature range.

By introducing Curie temperature metal into the combination of elements as contemplated by the present invention the structure can be made to have a greater degree of temperature response to thus establish a finer degree of sensitivity to temperature changes over an adjustable temperature scale. In accordance with the invention the operator of the magnetically actuated switch is formed of a Curie temperature alloy and since the same is operated by a temperature responsive element, the action, resulting in the closing of switch contacts on a drop in temperature and opening of said contacts on a rise in temperature, is one of accelerating the operation at the point of temperature change at which the device has been set to operate. Here the change in temperature not only moves the operator in and out of the magnetic field to effect switch operation but additionally affects the magnetic characteristics of the Curie metal to contribute its magnetic influence at the point of operation. Thus this additional force, responsive to temperature changes, adds and subtracts from the forces producing switch operation and thereby renders switch response to temperature changes more sensitive.

In connection with the use of Curie metal, as above set forth, it may be desirable in certain devices to employ compensating means to compensate for the effect which the temperature variations will have upon the effectiveness of the Curie metal as an operating element throughout the range of the device. Therefore another object is to incorporate compensating means in the combination switch structure of the invention to compensate for the changing magnetic qualities of the Curie metal throughout the operating range of the device so as to maintain a substantially constant operating differential for any particular setting.

With these and various other objects in view, the invention may consist of certain novel features of construction and operation as will be more fully described and particularly pointed out in the specification, drawings and claims appended thereto.

In the drawings which illustrate an embodiment of the invention, and wherein like reference characters are used to designate like parts—

Figure 1 is an elevational view, with parts being shown in section, of a mercury type switch with armature, the said switch having a movable electrode responsive to minute magnetic forces for its operation;

Figure 2 is a front elevational view of a room thermostat embodying the improved features of the invention and which employs bi-metallic temperature responsive means; and Figure 3 is a side elevational view of another type of room thermostat characterized by a liquid filled temperature responsive element and which also embodies the improved features of the invention.

Referring to the drawings, the switch 10, disclosed in Figure 1, includes an hermetically sealed glass and metal housing formed by the glass tube 11 and the metal end caps 12 and 13. The said metal caps comprise the terminals of the electric switch structure and the same are adapted for connection in an electrical circuit by means of the conductors 14 and 15, respectively. The end cap 12 provides the support for the stationary member 16 which is electrically connected thereto and which depends centrally through the glass tube and has secured to its lower end the capillary tube 17. The glass insulator 18 is interposed in the stationary member 16 for electrically insulating the capillary tube 17 from the current carrying parts above the insulator. The end cap 13 retains a quantity of mercury 20 or other electrical conducting fluid which is thus in electrical contact with this terminal end of the switch. The lower end of the capillary tube is immersed in the mercury pool and since the capillary tube is provided with an opening such as 21, a contacting surface or meniscus of mercury is provided above the level of the pool for contact by a movable electrode in a manner which will now be described.

The second or movable electrode identified by numeral 22 is supported from member 16 by means of the support member 23, there being interposed between the support and the movable electrode a flexible hinge member 24 which is preferably formed of relatively thin, flat, spring metal and which provides a knife-edge bearing in order to facilitate flexing movement of the movable electrode 22. Intermediate the length of the movable electrode 22 there is suitably fixed thereto an armature in the form of a magnet 25 adapted to be actuated by a metal operator such as 26 located exteriorly of the switch housing whereby the desired movements may be imparted to electrode 22. The lower depending end of the movable electrode 22 is bent to provide the contact 27 adapted to enter and depart from opening 21 in the capillary tube and thus being adapted to engage with and disengage from the meniscus of mercury provided by said opening. The part 28 suitably fixed to the movable electrode 22 depends therefrom in definite spaced relation so as to form an electrode stop. Accordingly, it will be observed that when the part 28 is in engagement with the insulator 18 the movable electrode 22 is located in its extreme out of contact position, the said electrode automatically assuming this position by reason of the tension imparted thereto by the spring hinge member 24. Accordingly, in order to cause the movable electrode to close the electric circuit of the switch it is necessary to attract the magnet 25, causing movement of the electrode 22 to the right and contact of the point 27 with the mercury pool 20.

In accordance with the invention, the operator 26 is formed of Curie metal of the desired magnetic characteristics, and when the same is moved far enough into the magnetic field of the magnet 25 the forces of magnetic attraction will cause movement of said magnet toward the operator, and accordingly the movable electrode 22 will be moved to the right to thereby close the electric circuit of the switch since the point 27 will make electrical contact with the mercury in the capillary tube 17. The contact is broken and the circuit is opened when the Curie metal operator is withdrawn from the holding forces of the magnetic field.

The mercury switch and Curie metal operator of Figure 1 may be incorporated in a room thermostat in a manner as shown in Figure 2. The support plate 30 mounts a terminal block 31 for electrical connection with the terminals of the switch 10 which incorporates a magnetic armature 25, as described in the device of Figure 1. A carrier member 32 is provided for the bi-metal thermostatic element 33, one end of which is secured by fastening means 34 to member 35 which carries the operator 26 of Curie metal. The clamp screw 39 functions to unite the adjusting lever 36 to the carrier member 32, which, however, is not done until after calibration of the thermostat. Thereafter the position of the lever 36 determines the point of operation for the particular device. The lever 36, carrier member 32, and bi-metal thermostatic element 33 as a unit are suitably mounted for rotation on a pivot post, not shown, which extends upwardly from the plate 30, and the parts are suitably retained on the pivot post by the screw 37. The upper end of lever 36 has coaction with a scale 38 having indicia thereon indicating the desired temperature range for the device, and the particular temperature for which the lever may be set can be observed through the opening 40. The numeral 41 indicates a bi-metal compensator fixed at 42 to the support plate 30 and which carries at its lower depending end the adjustable stop 43 which extends through an opening in member 35 and is provided with the head 44. The head limits movement of the operator 26 in a switch closing direction and by adjustment of said stop the desired compensating effect on the action of the operator can be secured.

In the device of Figure 2 a normally open contact switch is employed and the temperature responsive element 33 is adapted to move the Curie metal operator 26 toward the switch on falling temperatures and away from it on rising temperatures. The change in temperature which effects this operation and which thus results in a making and breaking of the switch circuit is the operating differential of the switch. One may select a Curie metal which has the characteristic of attaining its greatest magnetic qualities within the operating range of the device. It is the contributing magnetic forces within the Curie metal, throughout the operating range of the thermostat, which renders the thermostat responsive to smaller changes in temperature for effecting switch operation than can be obtained with metal lacking the said quality. Thus with declining temperatures, the Curie metal becomes more magnetic to accelerate response of the switch to close, and, conversely, with increasing temperature the Curie metal becomes less magnetic to accelerate opening of the switch.

Since the magnetic properties of Curie metal increase with declining temperatures, it is expected that over an operating range of, for example, 30 degrees Fahr., or more, its accelerating effect on switch operation would vary. To establish a substantially uniform of assistance from the Curie metal an adjustable stop is employed in combination with a compensating bi-metal element. By this means the gap between the Curie metal and switch magnet may be established to effect operation at one setting on the scale, whereafter, the gap will be automatically widened at the point of operation for a low setting to compensate for the increase in the magnetic quality of the Curie metal, and the gap will be automatically narrowed at the point of operation for a high setting to compensate for the decrease in the magnetic qualities of the Curie metal.

The mass constituting the structure of a temperature responsive device becomes a factor in the control of space temperature, notwithstanding the degree of sensitivity of the device to temperature changes. Although an instrument may operate on small changes of temperature, its operation with respect to time may be such as to permit space temperature to change more than may be desired. This can be attributed to the mass of instrument structure which soaks up and dissipates heat to influence performance of the thermostatic element embodied in it. In fact, the element itself in terms of mass is decidedly a factor. Thus, while the instrument may actually operate on small changes in temperature, the time involved for the structure to reflect them can result in space temperature changes which become noticeable, if not objectionable, to occupants.

With the introduction of Curie metal and its influencing effect to reduce operating differentials as embodied in this invention a reduction in mass of the bi-metal temperature responsive element can be realized to benefit to the ultimate improved instrument sensitivity with shorter time of response to temperature changes, thus reducing space temperature changes as an accompaniment to improved thermostat performance.

Referring again to the drawings, the device of Figure 3 is another form of room thermostat which, however, employs a liquid filled wafer which is expansible in response to temperature changes. The support plate 50 is provided with an adjustable bracket indicated by numeral 51 and which is suitably secured at 52 to the plate, with a bracket hinge 53 being located between the parts. The adjustable bracket 51 has the mercury switch 10 suitably secured thereto, said switch incorporating the magnetic armature 25 and having the conductors 14 and 15 of the electric circuit in electrical connection with its metal end caps, all in a manner as previously described in connection with Figure 1. A pair of support rods 54 and 55 are suitably fixed to plate 50 and extend to the right for positioning the member 56 to which is threadedly secured the adjustment screw 57. The screw is adapted to contact the flange 58 provided by the adjustable bracket 51. The rod 55 passes through an opening in flange 58 and the bracket spring 60 is confined between plate 50 and the said flange 58 to thus apply tension to the adjustable bracket 51, urging the same to the right, thus holding flange 58 in contact with stop 57. By adjustment of stop 57 it will be seen that the position of bracket 51 can be adjusted.

As explained, the temperature responsive element of the device of Figure 3 comprises a liquid filled wafer 61 having secured thereto the shaft socket 62 which receives the operating shaft 63. Said shaft 63 passes through the bearing 64 and is adapted to engage the movable arm 65 relatively close to the pivot 66 for said arm which pivotally supports the arm from the adjustable bracket 51. The lower depending end of arm 65 carries the Curie metal operator 26 and a member 67 is also secured to this end of the movable arm for positioning the adjustable stop 68 in proper location with respect to the bi-metal compensator 70.

In operation of the device of Figure 3, the movable arm 65 is normally influenced by gravity so that it depends vertically and thus positions the operator 26 relatively close to the switch 10 and within the magnetic forces of the magnet 25 so that the magnet is attracted to move the movable electrode thereof to the right, effecting a closing of the switch contacts. When the thermal wafer expands on rising temperature, the shaft 63 is caused to move to the right and as a result of its engagement with movable arm 65 the arm is caused to move with respect to its pivot 66, as a result of which the Curie metal operator 26 is withdrawn from the switch and the switch contacts are caused to open. The adjusting screw 57 in acting against the bracket spring 60 will function as a positioning element for the bracket 51 and thus for the movable arm 65, whereby the relationship between the free end of shaft 63 and the arm may be varied. Adjustment of the screw 57 will thus set the operating point for the thermostat by increasing or decreasing the gap between the end of shaft 63 and the movable arm 65. If the width of this gap is varied, it will be understood that more or less expansion of the wafer will be required to effect operation of the movable arm and thus operation of the switch. By adjustment of the stop 68 the compensating effect of the bi-metal member 70 can also be varied in a manner as previously described in connection with Figure 2, all for the purpose of compensating for the varying influence of the Curie metal of the operator over the operating range of the instrument.

While the present invention has been represented in those forms which contribute to a reduction of instrument mass as it affects temperature response of the device, it is evident that operation of similar magnetically operated instrumentalities may be improved by carrying out the teachings disclosed herein. Also the devices illustrated disclose structures employing normally open switches which are closed with declining temperatures. Of course, the benefits of the invention may likewise be realized by opening the switch circuit on declining temperatures through the use of normally closed switches, and further, such other modifications as reversing the position of the magnet 25 and the Curie metal operator 26 so that the operator 26 becomes part of the structure of switch 10 and the magnet 25 the exteriorly positioned operator.

In the appended claims Curie temperature material defines any metal, alloy or other material which has the temperature sensitive, magnetic characteristics adaptable to the use described herein.

What is claimed is:

1. In a temperature responsive device, the combination including a switch adapted to be included in an electrical circuit, actuating means therefor comprising a magnet and an operator, and temperature responsive means for controlling operation of the said actuating means by varying the proximity of the magnet and operator with respect to each other, said operator consisting of a Curie temperature material characterized by having magnetic properties throughout the operating range of the temperature responsive means such as will assist the action of the temperature responsive means in producing actuation of the switch.

2. In a temperature responsive device, the combination including a magnetically operated switch adapted to be included in an electric circuit, actuating means therefor including a magnet comprising part of the switch and an operator for the magnet, and temperature responsive means for controlling operation of the said actuating means by varying the proximity of the magnet and operator with respect to each other, said operator consisting of a Curie temperature material adapted to lend its magnetic influence throughout the operating range of the temperature responsive means in a manner to assist the action of the temperature responsive means in producing actuation of the switch by accelerating said action at the point of temperature change for which the temperature responsive means has been set to operate.

3. A temperature responsive device, including in combination, a magnetically operated switch adapted to be included in an electric circuit, actuating means therefor comprising a magnet forming part of the switch and an operator for the magnet, and temperature responsive means for controlling operation of the said actuating means by varying the proximity of the magnet and operator with respect to each other, the improvement which consists in providing an operator of Curie temperature material adapted to lend its variable magnetic properties throughout the operating range of the device in a manner to assist the action of the actuating means in producing actuation of the switch by accelerating said action at the point of temperature change for which the device has been to set to operate, and a temperature responsive compensator for the temperature responsive means constructed and arranged to compensate for the change in the magnetic influence of the Curie material at different temperature points for which the device may be set to operate.

4. A temperature responsive device, including in combination, a mercury switch having at least one movable contact, an armature for said movable contact comprising a magnet, an operator for effecting switch actuation through magnetic attraction of said magnet, and temperature responsive means for producing movement of the operator in accordance with temperature changes, the improvement which consists in providing an operator of Curie temperature material adapted upon a decrease in its magnetic property on rising temperatures and an increase in magnetic property on declining temperatures to improve switch actuation by rendering the switch more responsive to temperature changes, and a bi-metallic compensating element for the temperature responsive means, said compensating element being constructed and arranged to compensate for the variations in the magnetic influence of the Curie material over the temperature range of the device whereby the operating differential of the switch is approximately constant throughout its particular temperature range.

5. In a temperature responsive device, the combination including switch contacts, operating structure therefor, magnetic means affecting actuation of the switch structure to open and close the contacts comprising a magnetic operator and a permanent magnet, one of said means forming part of the switch structure and the other movable with respect to the first to produce switch operation as the forces of magnetism increase and decrease upon varying the proximity of operator and magnet to each other, temperature responsive means for actuating the movable means for controlling switch operation in accordance with temperature changes, and one of said magnetic means being of Curie temperature material to be affected by said temperature changes to lend its magnetic influence, at the point of thermostatic operation, to accelerate the opening and closing of the switch contacts.

6. In a temperature responsive device, the combination including a mercury switch having at least one movable contact, an armature for said movable contact comprising a magnet, an operator for effecting switch actuation through magnetic attraction of the said magnet, and temperature responsive means for producing movement of the operator in accordance with temperature changes to vary the proximity of the operator with respect to the magnet, said operator consisting of a Curie temperature material having magnetic properties which are variable throughout the operating range of the temperature responsive means since the magnetic properties of the said Curie material decrease on rising temperatures and increase on declining temperatures, whereby the forces of magnetic flux acting to attract the magnet are modified to render the switch more responsive to temperature changes.

7. In a temperature responsive device, comprising in combination, a sealed container providing an electric switch having at least one movable contact, a magnetic armature fixed to the movable contact, an operator for effecting actuation of the movable contact through magnetic attraction of the armature whereby to cause opening and closing of the switch, and a temperature responsive member for moving the operator in accordance with temperature changes to vary the proximity of the operator with respect to the armature, the improvement which consists in providing a Curie temperature material for the operator adapted to increase in magnetic properties with declining temperatures to accelerate response of the switch to close, and conversely, to decrease in magnetic properties with increasing temperatures to accelerate response of the switch to open, compensating means in the form of a thermal responsive element carrying an adjustable stop, said thermal responsive element being positioned with respect to the temperature responsive member so that the stop thereof limits movement of the operator in a switch closing direction, whereby the compensating means functions to compensate for variations in the magnetic properties of the Curie material over the operating range of the device to thus render the operating differentials of the switch approximately constant for said range.

References Cited in the file of this patent

UNITED STATES PATENTS

| | | |
|---|---|---|
| 2,214,928 | Klapperich | Sept. 17, 1940 |
| 2,227,291 | Wittmann | Dec. 31, 1940 |
| 2,232,501 | Wittmann | Feb. 18, 1941 |
| 2,296,969 | Wittmann | Sept. 29, 1942 |